(12) United States Patent
Devarakonda et al.

(10) Patent No.: US 8,775,590 B2
(45) Date of Patent: Jul. 8, 2014

(54) REACTIVE MONITORING OF GUESTS IN A HYPERVISOR ENVIRONMENT

(75) Inventors: Murthy V. Devarakonda, Peekskill, NY (US); Rafah A. Hosn, New York, NY (US); Ruchi Mahindru, Elmsford, NY (US); Soumitra Sarkar, Cary, NC (US); Mahesh Viswanathan, Yorktown Heights, NY (US); Norbert G. Vogl, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 589 days.

(21) Appl. No.: 12/874,717

(22) Filed: Sep. 2, 2010

(65) Prior Publication Data

US 2012/0059930 A1 Mar. 8, 2012

(51) Int. Cl.
*G06F 15/173* (2006.01)

(52) U.S. Cl.
USPC .......................................... 709/223; 709/224

(58) Field of Classification Search
USPC ................................................ 709/224, 223
See application file for complete search history.

(56) References Cited

U.S. PATENT DOCUMENTS

| | | | |
|---|---|---|---|
| 5,737,319 A | | 4/1998 | Croslin et al. |
| 8,141,075 B1 * | | 3/2012 | Chawla et al. .................... 718/1 |
| 2006/0174000 A1 * | | 8/2006 | Graves .......................... 709/225 |
| 2008/0059556 A1 * | | 3/2008 | Greenspan et al. ........... 709/201 |
| 2008/0134177 A1 * | | 6/2008 | Fitzgerald et al. ................ 718/1 |
| 2008/0155069 A1 * | | 6/2008 | Kunhappan et al. .......... 709/220 |
| 2009/0007112 A1 * | | 1/2009 | Moriki et al. ..................... 718/1 |
| 2009/0024994 A1 * | 1/2009 | Kannan et al. ..................... 718/1 |
| 2009/0169017 A1 * | 7/2009 | Smith et al. .................... 380/278 |
| 2010/0122248 A1 * | 5/2010 | Robinson et al. ................. 718/1 |
| 2010/0169507 A1 * | 7/2010 | Sahita et al. .................... 709/250 |
| 2010/0169666 A1 * | 7/2010 | Dewan et al. ................... 713/190 |
| 2010/0192020 A1 * | 7/2010 | Van Riel et al. ................. 714/38 |
| 2011/0004676 A1 * | 1/2011 | Kawato .......................... 709/221 |
| 2011/0004680 A1 * | 1/2011 | Ryman .......................... 709/224 |
| 2011/0029971 A1 * | 2/2011 | Yamasaki et al. ................. 718/1 |
| 2011/0040860 A1 * | 2/2011 | DeCusatis et al. ............. 709/223 |
| 2011/0078510 A1 * | 3/2011 | Beveridge et al. ........... 714/38.1 |

(Continued)

OTHER PUBLICATIONS

"Realizing True Data Integrity Through Automated Discrepancy Management", Telcordia Technologies, Inc., 2009, pp. 1-5.

(Continued)

*Primary Examiner* — Waseem Ashraf
(74) *Attorney, Agent, or Firm* — Scully, Scott, Murphy & Presser, P.C.; Louis J. Percello, Esq.

(57) ABSTRACT

A system, method and computer program product for detecting and reacting to a network discrepancy within a data center network environment. The method comprises monitoring network traffic between a first computer configured as a first hypervisor inter-networked within the data center network environment and a second computer inter-networked within the data center network environment in order to detect a presence of a predetermined condition representing a presence of the network discrepancy in the data center network environment between a recorded state of the data center network environment and an observed state of the data center network environment. The monitoring includes determining the observed state of the data center network environment using one of: polling, event-based or a combination thereof. The method also comprises rectifying, upon the detection of the presence of the predetermined condition, an effect associated with the presence of the predetermined condition in the data center network environment.

16 Claims, 5 Drawing Sheets

(56) References Cited

U.S. PATENT DOCUMENTS

| | | | |
|---|---|---|---|
| 2011/0099548 A1* | 4/2011 | Shen et al. | 718/1 |
| 2011/0103389 A1* | 5/2011 | Kidambi et al. | 370/395.1 |
| 2011/0131316 A1* | 6/2011 | Ferris et al. | 709/224 |
| 2011/0197060 A1* | 8/2011 | Mukherjee | 713/155 |
| 2011/0238969 A1* | 9/2011 | Warkentin et al. | 713/2 |
| 2011/0283279 A1* | 11/2011 | Graves | 718/1 |
| 2011/0302577 A1* | 12/2011 | Reuther et al. | 718/1 |
| 2012/0084570 A1* | 4/2012 | Kuzin et al. | 713/182 |
| 2012/0167211 A1* | 6/2012 | Mao et al. | 726/22 |
| 2012/0198344 A1* | 8/2012 | Tukol et al. | 715/735 |
| 2012/0291094 A9* | 11/2012 | Forrester et al. | 726/3 |

OTHER PUBLICATIONS

Rutenberg et al., "How to Extract Maximum Information From Event-Driven Topology Updates", IEEE 1993, pp. 1004-1014.

User Guide for Campus Manager 5.1 (With LMS 3.1)—Chapter 8 Discrepancies and Best Practices Deviations, Cisco Campus Manager 5.1, http://www.ciscosystems.com/en/US/docs/net_mgmt/ciscoworks_campus_manager/5.1/user/guide/discrep.html, last printed Sep. 1, 2010, pp. 1-43.

Hao et al., "Enhancing Dynamic Cloud-based Services using Network Virtualization", VISA'09, Aug. 17, 2009, Barcelona, Spain, pp. 37-44.

Voorsluys et al., "Cost of Virtual Machine Live Migration in Clouds: A Performance Evaluation", Grid Computing and Distributed Systems Laboratory, Department of Computer Science and Software engineering, The University of Melbourne, Australia; http://www.gridbus.org/reports/VM-Migration-Cloud2009.pdf, pp. 1-12.

"802.1X Port-Basted Authentication HOWTO", http://www.linux.org/docs/howto/8021X-HOWTO/index.htmi; Aug. 8, 2001; pp. i-38.

Davies, "The Cable Guy", http://207.46.16.252/en.us/magazine/2008.02.cableguy.aspx, Feb. 2008, pp. 1-5.

* cited by examiner

SWITCH FORWARD TABLE

| PORT — 210 | MAC — 220 |
|---|---|
| A | MAC OF 102(A) |
| A | MAC OF 104(A) |
| A | MAC OF 104(B) |
| B | MAC OF 102(B) |
| A | MAC OF 104(D) |

HYPERVISOR FORWARD TABLE

| HYPERVISOR — 310 | MAC — 320 | SWITCH — 330 | PORT — 340 |
|---|---|---|---|
| 101(A) | MAC OF 102(A) | 109 | A |
| 101(B) | MAC OF 102(B) | 109 | B |

PUBLISHED INVENTORY TABLE

| HYPERVISOR — 410 | GUEST — 420 | MAC — 430 | RUN-STATE — 440 |
|---|---|---|---|
| 101(A) | 105(A) | MAC OF 104(A) | POWERED-ON |
| 101(A) | 105(B) | MAC OF 104(B) | POWERED-OFF |
| 101(A) | 105(C) | MAC OF 104(C) | POWERED-ON |
| 101(B) | 105(D) | MAC OF 104(D) | POWERED-ON |
| 101(B) | 105(E) | MAC OF 104(E) | POWERED-OFF |

REACTIVE MONITORING OF GUESTS IN A HYPERVISOR ENVIRONMENT

TECHNICAL FIELD

The disclosed technology is generally related to computing infrastructure services, and in particular, to operation of virtualized computing platforms.

BACKGROUND

Hypervisor technology efficiently facilitates the concurrent virtual operation of multiple guest operating systems, including multiple instances of the same operating system, on a non-virtual host computer. The hypervisor presents each guest operating system with a virtual operating platform and monitors the execution of each guest operating system in a way that all guest operating systems can properly and efficiently share the hardware resources available to the host computer. Through the use of a hypervisor, each guest operating systems appears identical to the host computer. Users of each guest operating system may be able to install applications on each guest operating system without impacting users of other guest operating systems operating on the host computer. When one guest operating system experiences a malfunction or a failure, the hypervisor will efficiently isolate that malfunction or failure from impacting the operation of other concurrently running guest operating systems. A proper distribution of guest operating systems over hypervisors can allow hypervisors to efficiently share their compute resources and avoid resource contention bottlenecks. Hypervisor vendors and other software providers have tools for managing guest operating systems in cloud computing environments and determining the proper guest operating systems placement.

Hypervisors are an important tool often used in consolidation of computers in order to reduce electricity, cooling, facility and other costs involved in running data centers. Hypervisors can also be used to migrate entire data centers from one geographic location to another and to construct various cloud computing environments. These environments are composed of hypervisors which together may host a multitude of guest operating systems. These environments are notable for their scalability i.e. if more compute power is needed to handle an increased workload, the hypervisors may provide additional resources to guest operating systems they host. The hypervisors may also increase the number of hosted virtual guest operating systems and, if necessary, additional hypervisors can be added to the compute cloud. As workload eases, the hypervisors may be powered off, or be put into a lower power state, in order to conserve electricity and other operating costs, or removed from the compute cloud entirely.

There are many types of hypervisors in the marketplace and a platform virtualization infrastructure may be composed of a combination of hypervisors. This is called a hybrid infrastructure. A hybrid compute cloud is a composite cloud which includes virtual resources from at least two independent compute clouds. Often, a company may operate a private compute cloud within its own data center. If the company needs additional compute resources, to handle increased demand in a busy time of the year, for example, the company may purchase virtual servers from a vendor compute cloud, such as AMAZON WEB SERVICES®.

The hypervisors are typically connected to each other through a computer network. Computer networks are well known in the art and Ethernet based computer network based on an IEEE 802 standard is predominant. Currently, Ethernet is standardized as IEEE 802.3, which is incorporated by reference as if fully set forth herein. An Ethernet computer network typically connects computers via Network Interface Cards (NIC) and one or more network routers and network switches. Network firewalls are used to limit information flow between computer networks and provide data and other resource protection.

Cloud computing networks provide a management interface, such as a web page or a communication protocol, by which guest operating systems can be controlled. New guest operating systems can be provisioned for, started, stopped, paused or deleted via the management interface. Guest operating systems can also be moved from one hypervisor to another. Because the hypervisors provide a common level of virtualization, guest operating systems may be moved from being hosted on one hypervisor to another without the knowledge or intervention of the users of the cloud. Other interactions with the guest operating systems via the management interface involve controlling hibernation, which is an operation where the compute state of the virtual guest operating system is recorded and the guest operating system is powered down. The compute state of the guest operating system can then be restored, possibly on a different hypervisor or even in a different compute cloud, at a later time. Further, by initiation via the management interface one or more copies of a guest operating system's compute image may also be cloned and started as additional guest operating systems. Hence, the compute cloud offers clients a great deal of agility in the creation and management of guest operating systems since guest operating systems can be created, destroyed, hibernated, cloned and moved.

The high agility of guest operating systems virtualized by hypervisors introduces many problems. Data centers are typically designed for a static environment where computers are physical entities, which often do not move. Computers are connected to network switches and other devices in a planned fashion and they are not disconnected except during maintenance and decommissioning. The tools and information repositories used to maintain data centers reflect these older best practices.

The increased frequency of guest operating systems entering and leaving a compute cloud, or physical computers offloading computing needs to guest operating systems in a hybrid cloud manner, introduces many complications. It is important, but difficult, to maintain and track an accurate inventory of guest operating systems and know which cloud or hypervisor is hosting which guest operating systems at any given time. Auditing techniques are desired to ensure the integrity of the extended data center. An accurate inventory of guest operating systems is also important for purposes of accounting, billing, customer support, security and right-sizing of compute resources.

Furthermore, errors may occur during the creation, deletion, movement, cloning and/or hibernation of guest operating systems. For example, an error in the hypervisor may leave a guest operating system, which is supposed to be powered-off, in a powered-on state. This error, in combination with guest operating system movement, may cause an unwanted copy of the guest operating system to be running. If an error occurs during guest operating system movement, then it may be difficult to determine where the guest operating system is.

Also, tools for guest operating system placement and redistribution may introduce errors in the hypervisors and inventory records particularly if two or more guest placement tools, or engines, are used. There is no established standard for orchestrating guest operating system placement engines and they may inadvertently compete against each other. Placement engines typically operate directly in-conjunction with the hypervisors and do not directly notify other inventory systems.

Often, polling and an adherence to data center best practices and management mandates are used to alleviate these problems. That is, hypervisors are periodically polled to determine which guest operating systems they are hosting and the managers of data centers typically allow only a single guest operating system placement engine to be used in a cloud. Also, strict adherence to documentation and process are mandated in order to maintain cloud synchronization and reduce the creation of rogue guest operating systems. However, even these practices may have limitations because the polling is typically slow and cannot keep pace with the agility of the cloud. Users also may desire features offered by their preferred placement engines. Finally, best practices of documentation and process are also subject to human error.

SUMMARY

In accordance with one embodiment, there is provided a computer-implemented method for detecting and reacting to a network discrepancy within a data center network environment. The method comprises monitoring network traffic between a first computer configured as a first hypervisor inter-networked within the data center network environment and a second computer inter-networked within the data center network environment in order to detect a presence of a predetermined condition representing a presence of the network discrepancy in the data center network environment between a recorded state of the data center network environment and an observed state of the data center network environment. The monitoring includes determining the observed state of the data center network environment using one of: polling, event-based or a combination thereof. The method also comprises rectifying, upon the detection of the presence of the predetermined condition, an effect associated with the presence of the predetermined condition in the data center network environment.

In accordance with yet another embodiment, there is provided a computer system for detecting and reacting to a network discrepancy within a data center network environment. The system comprises a memory and a processor in communications with the computer memory. The computer system is capable of performing a method comprising monitoring network traffic between a first computer configured as a first hypervisor inter-networked within the data center network environment and a second computer inter-networked within the data center network environment in order to detect a presence of a predetermined condition representing a presence of the network discrepancy in the data center network environment between a recorded state of the data center network environment and an observed state of the data center network environment. The monitoring includes determining the observed state of the data center network environment using one of: polling, event-based or a combination thereof. The method also comprises rectifying, upon the detection of the presence of the predetermined condition, an effect associated with the presence of the predetermined condition in the data center network environment.

In accordance with yet another embodiment, there is provided a computer program product for detecting and reacting to a network discrepancy within a data center network environment. The computer program product comprising a storage medium readable by a processing circuit and storing instructions for execution by the processing circuit for performing a method. The method comprising monitoring network traffic between a first computer configured as a first hypervisor inter-networked within the data center network environment and a second computer inter-networked within the data center network environment in order to detect a presence of a predetermined condition representing a presence of the network discrepancy in the data center network environment between a recorded state of the data center network environment and an observed state of the data center network environment. The monitoring includes determining the observed state of the data center network environment using one of: polling, event-based or a combination thereof. The method also comprises rectifying, upon the detection of the presence of the predetermined condition, an effect associated with the presence of the predetermined condition in the data center network environment.

BRIEF DESCRIPTION OF THE DRAWINGS

The objects, features and advantages of the disclosed technology will become apparent to one skilled in the art in view of the following detailed description taken in combination with the attached drawings, in which.

DETAILED DESCRIPTION OF THE PREFERRED EMBODIMENTS

The following are definitions of terms used in the following description of the embodiments of the disclosed technology.

A computer network, often simply referred to as a network, is a collection of computers and devices connected by communications channels that facilitates communications among computers and allows computers to share resources with other computers. Often, the computers and devices are connected using twisted-pair wires and other Ethernet technology.

A data center is a facility used to house computer systems and associated components, such as telecommunications and storage systems. Often, the data center includes redundant or backup power supplies, redundant data communications connections, environmental controls and security devices.

A data center network environment is the computer network (or networks) used for communication within the data center. The data center network environment also includes gateway devices, which may interconnect one data center network environment to another.

Cloud computing is network-based computing, whereby shared resources, software, and information are dynamically provided to computers and other devices on demand, like the electricity grid. Typical cloud computing providers deliver common business applications online that are accessed from another Web service or software, like a Web browser, while the software and data are stored on servers.

A computer includes at least one processor, memory, an operating system and a communication port.

Network traffic are digital communications between a computer and a device within the data center network environment. Often, the network traffic follows Ethernet protocols where computers and devices exchange "packets" of data. Each packet may contain a control header containing addressing information, including source and destination Media Access Control (MAC) addresses, and a payload.

A recorded state is information stored in various inventory and topology databases and records. Generally, this information is intended, in part, to model the data center network environment.

An observed state is information obtained through communication with a network device, such as a network switch.

A network discrepancy is a logical difference found between the recorded state of the network environment and the observed state. For example, some network discrepancies include: a MAC address observed in network packets that is not found in the recorded state; a MAC address observed as being associated with a first computer or device, but being associated with a second computer or device in the recorded state; and a computer or device listed in the recorded state but not being observed.

An event-based technique is a computer programming paradigm where sensors or computer programs communicate events to listening computer programs. A sensor, such as a network device, may send a "Link Up" event using a Simple Network Management Protocol (SNMP) communication protocol when a network port is initialized. Event-based computer programs can listen for these SNMP events and take responsive action. Similarly, a RADIUS server may send an "Accounting Start" event to a listening computer program each time network access is granted to a computer or a network device, and an "Accounting Stop" event when network access is closed.

A predetermined condition is a condition which may be indicative of a network discrepancy. For example, the condition of a MAC address appearing in a network switch forward table may indicate a network discrepancy, and the condition of a MAC address expiring from a network switch forward table may also indicate a network discrepancy.

A zombie guest operating system is a guest operating system which is still at least partially running despite a hypervisor attempt to shut it down.

Figure 1:
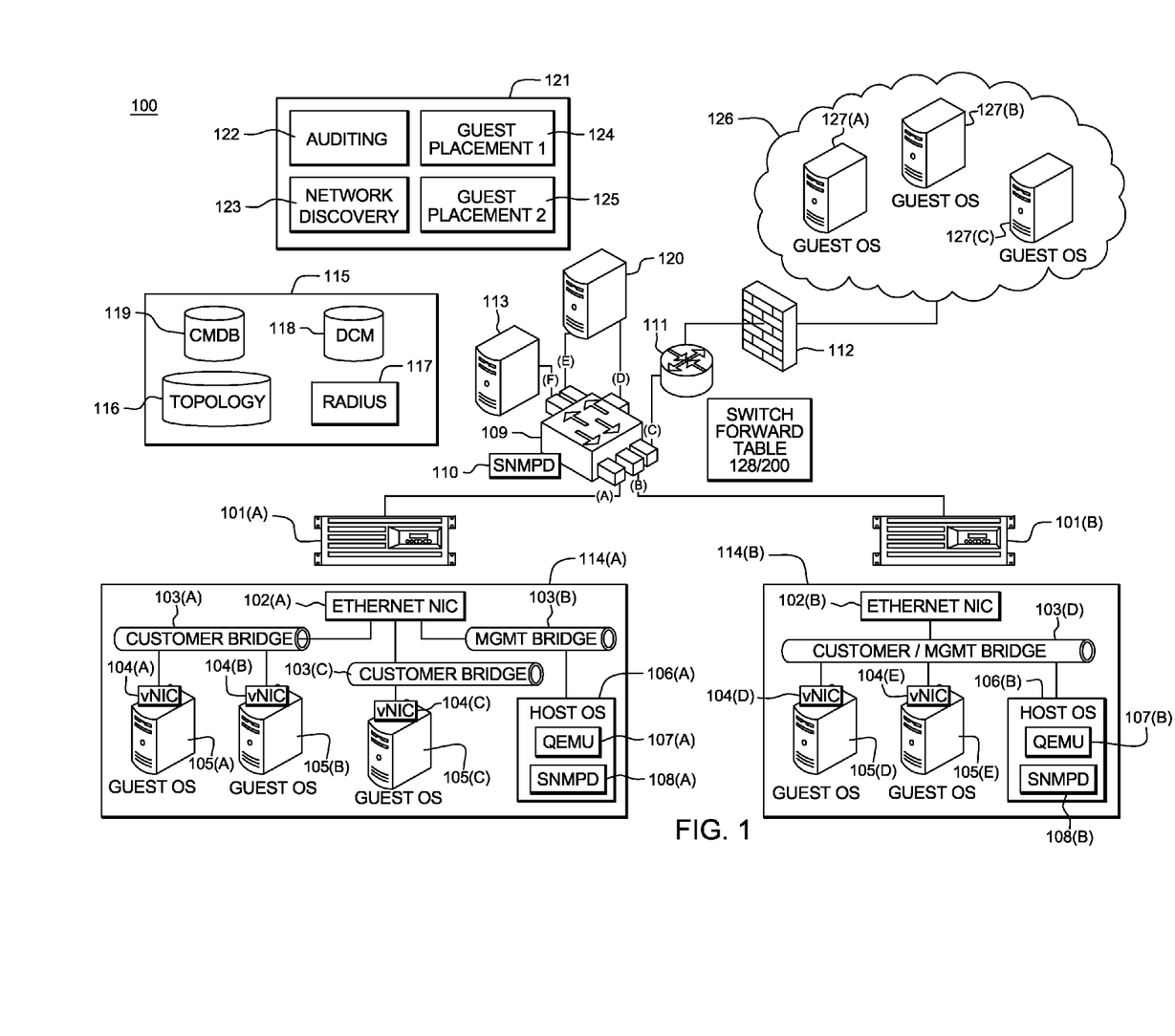
FIG. 1 symbolically shows one example of a hybrid cloud environment in which the disclosed technology may be operated.

FIG. 1 symbolically shows one example of a hybrid cloud environment in which the disclosed technology may be operated. Hybrid cloud environment 100 includes non-virtual computers 101(A), 101(B), a network switch 109, a network router 111, a firewall 112, a first server 113 and a second server 120. Hybrid cloud environment 100 may be connected to a network 126.

Non-virtual computers 101(A), 101(B) function as hypervisors and thus host zero or more virtual computers, also known as guests. Each guest is running an operating system, such as MICROSOFT WINDOWS® or LINUX®. As shown in FIG. 1, in an example implementation, five guests are hosted on non-virtual computers 101(A), 101(B). Boxes 114(A), 114(B) indicate provision of any logical components in non-virtual computers 101(A), 101(B) respectively. For example, guests 105(A), 105(B), 105(C) are hosted on non-virtual computer 101(A). Guests 105(D), 105 (E) are hosted non-virtual computer 101(B).

Host operating systems 106(A), 106(B), which run on respective non-virtual computers 101(A), 101(B), are run as hypervisors. Some examples of such operating systems include LINUX® distributions such as REDHAT ENTERPRISE LINUX® with kernels supporting XEN® or KVM® hypervisors, MICROSOFT WINDOWS® and VMWare ESX®. The hypervisors each have various management interfaces 107(A), 107(B) which can be queried to obtain guests' information. Some examples of these queries include requests to list all guests that the hypervisor is hosting, to determine each guest's resource capabilities (e.g. how many virtual network cards are defined; and storage, memory and CPU constraints), to determine each guest's resource consumption and to determine each guest's current run state. In one embodiment, the run state is typically a keyword, such as "powered-on", "powered-off", "suspended" or "hibernated". Management interfaces 107(A), 107(B) represent an interface into a generic machine emulator and virtualizer, such as Quick Emulator (QEMU). Further provided at boxes 114A and 114B are respective management interfaces 108(A), 108(B) that each represent an interface into a respective network management daemon, such as Simple Network Management Protocol Daemon (SNMPd). However, the disclosed technology should not be construed to be limited to the above management interfaces. Any other management interface that performs a similar function as known in the art is contemplated to be within the scope of the disclosed technology.

In order to enable communication between guests 105(A), 105(B), 105(C), 105(D), 105(E) and other computing machines, non-virtual computers 101(A), 101(B) emulate networking hardware. Virtual network bridges and switches, 103(A), 103(B), 103(C), 103(D) are connected, through software, to non-virtual Ethernet NICs, 102(A), 102(B). Virtual NICs 104(A), 104(B), 104(C), 104(D), 104(E) are assigned to each guest 105(A), 105(B), 105(C), 105(D), 105(E), respectively. Some examples of implementations of virtual network bridges and switches include a virtual switch "vSwitch" on VMWARE ESX® Server, and brctl and "Open vSwitch" on LINUX®.

In one embodiment, non-virtual computers 101(A), 101(B) are connected to network switch 109 via dedicated ports 109(A), 109(B), of network switch 109. For simplicity, a single network switch is shown. However, more than one network switch may be used in a data center. In one embodiment, port traffic from port 109(C) is mirrored onto port 109(D).

Each NIC (both non-virtual and virtual) has a unique MAC address. Non-virtual computers 101(A), 101(B) include the identifier of the transmitting NIC within each data packet sent over the network. For example, if guest 105(A) transmits an Ethernet data packet destined for guest 105(D), then that data packet will originate at virtual NIC 104(A) and contain the MAC address of virtual NIC 104(A). The data packet will then flow over virtual network bridge 103(A) and be transmitted by non-virtual Ethernet NIC 102(A) to network switch 109 through switch port 109(A). The source MAC address within the data packet will contain the MAC address of virtual NIC 104(A). If guest 105(A) and guest 105(D) are peers on the same network subnet, then to transmit the data packet to guest 105(D), guest 105(A) sets the target MAC address to that of virtual NIC 104(D). The data packet would flow from network switch 109 through switch port 109(B) into non-virtual Ethernet NIC 102(B). Virtual network bridge 103(D), which, in one embodiment, is also used for management of data traffic, would deliver the data packet to guest 105(D) through virtual NIC 104(D).

Figure 2:
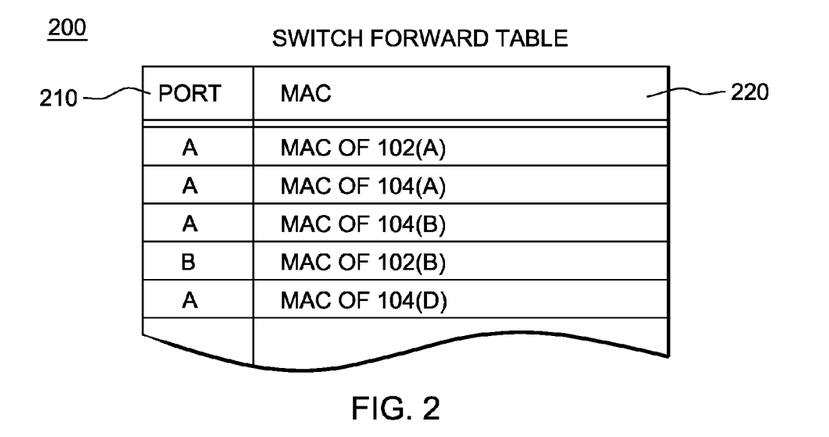
FIG. 2 shows one example of a network switch forward table.

As further explained in reference to FIG. 2, each network bridge (both virtual and non-virtual) and network switch (both virtual and non-virtual) include a data structure, such as a forward table 128, which is a lookup table that maps a MAC address to one of the ports 109(A), 109(B), 109(C), 109(D) of network switch 109. In one embodiment, the contents of forward table 128 enable network switch 109 to retransmit the packet from guest 105(A) onto switch port 109(B). In one embodiment, forward table 128 enables network switch 109 to conserve network bandwidth by only forwarding the packet to port 109(B) and not broadcasting the packet to all ports.

Managed network switches, such as network switch 109, which are switches which can be queried and/or configured through software, have a management network switch interface 110. By using a protocol, such as SNMP, management interface 110 allows computers and administrators to determine the contents of a network switch forward table 128. On non-virtual switches, such as network switch 109, network forward table 128 is typically populated by packet inspection. Upon packet entry, network switch 109 examines packet's source MAC address and entries are made into network switch forward table 128. Many implementations of network switch forward tables, such as network switch forward table 128, include a timeout value that indicates when an entry is considered stale and removed from the table. Network switch forward table 128 of virtual bridges, such as brctl, may also be populated by running commands in Linux.

Network router 111 is connected to port 109(C) and firewall 112. Network router 111 and firewall 112 are used to connect non-virtual computers 101(A), 101(B) (and other computing resources) with other networks. One example of such network is network 126, which may include the public interne and/or other private intranets. Computers 127(A), 127(B) and 127(C) on network 126 may be non-virtual computers, including those functioning as hypervisors, or virtual guests served by other cloud environments. Hybrid cloud environment 100 could be part of a broader hybrid or non-hybrid cloud infrastructure if, for instance, one or more guests 127(A), 127(B) and 127(C) were served by vendor clouds. Other types of hybrid clouds are ones where a mix of hypervisor technology is used, such as non-virtual computer 101(A) being VMWARE ESX® and non-virtual computer 101(B) being LINUX®/KVM®.

As further shown in FIG. 1, hybrid cloud environment 100 may include a first server 113 and a second server 120 which are both used for monitoring and management infrastructure of hybrid cloud environment 100. First server 113 and second server 120 may be guests on a non-virtual computer functioning as a hypervisor, such as non-virtual computers 101(A), 101(B). Alternatively, first server 113 and second server 120 may be non-virtual servers. First server 113 and second server 120 are operably interconnected within hybrid cloud environment 100 and can communicate with network switch 109 via ports 109(F), (E) and non-virtual computers 101(A), 101(B).

As further shown in FIG. 1, box 115 indicates provision of logical components in first server 113, which may include, for example, a Configuration Management Database (CMDB) 119, a Data Center Model (DCM) 118 and a topology database 116. Optionally, first server 113 may include a RADIUS (Remote Authentication Dial In User Service) server 117.

More particularly, CMDB 119 is a database related to all logical components of an information system and it provides some high level details about the configuration of non-virtual computers 101(A), 101(B) and their respective guests.

DCM 118 is a database, which provides a lower level of information about non-virtual computers 101(A), 101(B) and their guests. Generally, in contrast to CMDB 119, which provides high level, business oriented details, DCM 118 has lower level, more technical details about the configuration of non-virtual computers 101(A), 101(B) and their respective guests. DCM 118 is typically used in allocating and provisioning guests onto non-virtual computers 101(A), 101(B) by maintaining and updating an inventory of which guests are provisioned to non-virtual computers 101(A), 101(B), the amount of computing resources, such as CPU, storage, memory, network bandwidth, that each guest has been assigned and an estimate of the computing resources remaining on non-virtual computers 101(A), 101(B) for future guests.

Topology database 116 models the network topology of hybrid cloud environment 100. Topology database 116 contains topological information, such as which, if any, ports 109(A), 109(B), 109(C), 109(D) of network switch 109 are connected to other switches, how router 111 and firewall 112 are connected within hybrid cloud environment 100, and a mapping, which shows how non-virtual computers 101(A), 101(B) are connected to ports 109(A), 109(B), 109(C), 109(D). In one embodiment, topology database 116 may only be populated with information about the non-virtual infrastructure and does not concern itself with the virtual guest network connections.

In one embodiment, network switch 109 may communicate with RADIUS server 117 in order to authenticate devices, authorize the devices for network communication, and provide accounting metrics. In one embodiment, network switch 109 configured to communicate with RADIUS server 117 does so via the 802.1x protocol.

Box 121, associated with second server 120, indicates provision of some logical components of second server 120, which includes one or more guest placement engines 124, 125; a network discovery engine 123; and an auditing engine 122.

Guest placement engines 124, 125 determine an optimal placement for new guests. An example of guest placement engines 124, 125 is the TIVOLI PROVISIONING MANAGER® (TPM) available from International Business Machines, Inc. (IBM)® used in conjunction with an IBM TIVOLI SERVICE AUTOMATION MANAGER® (TSAM), which includes a placement engine which consults DCM 118 to select which non-virtual computer 101(A), 101(B) should host new guests. In one embodiment, this consultation occurs through a database connectivity API, such as Open Database Connectivity (ODBC) or Java Database Connectivity (JDBC), over TCP/IP. Another example of guest placement engine 124, 125 is a VMWARE CONTROL CENTER®, which uses non-virtual computer 101(A), 101(B) management interfaces, such as QEMUs 107(A), 107(B), to determine the current load of non-virtual computer 101(A), 101(B) and recommend guest placement. Guest placement engines 124, 125 may also perform guest migrations where a guest is moved from being hosted on one non-virtual computer 101(A), 101(B) to another. An example migration may include moving guest 105(A) away from non-virtual computer 101(A) and onto non-virtual computer 101(B). Often, particularly when more than one placement engine 124, 125 is in use, data contained in DCM 118 and CMDB 119 can become out of date.

In one embodiment, network discovery engine 123 populates topology database 116 with the topological information. This population is typically conducted by running ping scans over the network and through SNMP queries to some network devices, such as switches, routers, firewalls. An example of network discovery engine 123 is included in IBM's NETCOOL PRECISION IP EDITION® product.

Auditing engine 122 executes a process to determine whether a network discrepancy exists in hybrid cloud environment 100. In one embodiment, upon receipt, auditing engine 122 invokes one or more workflows (see FIGS. 6 and 7) in order to reduce at least one negative effect associated with network discrepancy.

The placement of the components (116, 117, 118, 119, 122, 123, 124 and 125) shown in two servers 113, 120 is for illustrative purposes only. Those skilled in the art of data center design will be familiar with other layouts. Further, CMDB 119 and DCM 118 need not be formal databases. In an exemplary cloud environment having twenty hypervisors and fifty guest operating systems, a spreadsheet implementation may suffice.

FIG. 2 shows one example of a network switch forward table. In one embodiment, network switch forward table 128, as discussed in reference to FIG. 1, is a network switch forward table 200. As shown in reference to FIG. 1, each network switch network bridge (both virtual and non-virtual) and network switch (both virtual and non-virtual) includes network switch forward table 200, which is a lookup table that maps a MAC address 220 to a network switch port 210. The contents of network switch forward table 200 enable the network switch to retransmit a packet from a guest onto the switch port on the network switch. Network switch forward table 200 enables the network switch to conserve network bandwidth by only forwarding the packet to the desired port and not broadcasting the packet to all ports.

Managed network switches (e.g. switches which can be queried and/or configured through software) have a management interface. This management interface, typically through the SNMP protocol, allows computers and administrators to determine the contents of the network switch forward table. On non-virtual switches, the network switch forward table is typically populated by packet inspection. As packets enter the network switch, the network switch examines their source MAC address and entries are made into the network switch forward table. Many implementations of network switch forward tables include a timeout value that indicates when an entry is considered stale and removed from the table. The network switch forward table of virtual bridges, such as brctl, may also be populated by running commands in Linux.

In one embodiment, network switch forward table 200 includes two columns: a first column 210 and a second column 220. The content of cells in first column 210 includes network switch port identifiers. The content of cells in second column 220 includes MAC addresses of Ethernet NICs, which are connected, directly or indirectly, to the corresponding port of the network switch referenced in column 210.

The content of first column 210 and second column 220 indicates that, as shown in FIG. 1, network switch 109 is connected to non-virtual computer 101(A) through network switch port A and NIC 102(A). Guests 105(A), 105(B) are also connected to switch port A through their virtual NICs 104(A) and 104(B), respectively. Similarly, non-virtual computer 101(B) is connected to network switch port B. The content of first column 210 and second column 220 also indicates that guest 105(D) is connected to network switch port A. This configuration differs from what is shown in FIG. 1 and indicates a discrepancy between a recorded state of hybrid cloud environment 100, as recorded in a published inventory table (see table 400 in FIG. 4), and an observed state of hybrid cloud environment 100, as recorded in network switch forward table 200.

In one embodiment, network switch forward table 200 may be retrieved from a managed network switch using a communication protocol, such as SNMP.

Figure 3:
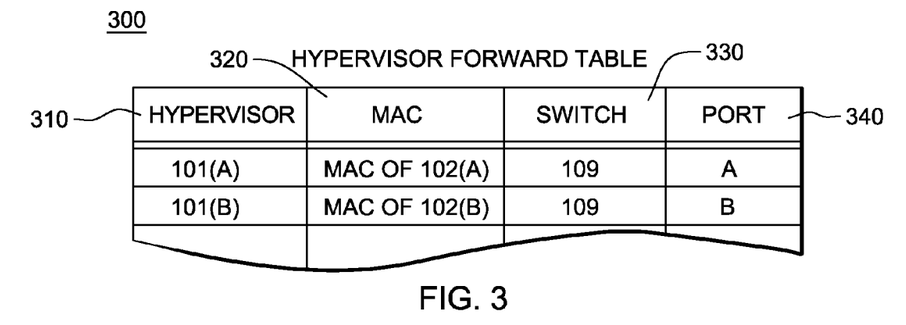
FIG. 3 shows one example of a hypervisor forward table.

FIG. 3 shows one example of a hypervisor forward table. In one embodiment, a hypervisor forward table 300 is implemented on non-virtual computers 101(A), 101(B) functioning as hypervisors via hosting operating systems 106(A), 106(B).

In one embodiment, hypervisor forward table 300 has four columns: a first column 310, a second column 320, a third column 330 and a fourth column 340. The content of cells in first column 310 includes hypervisor identifiers, which identify operating hypervisors. The content of cells in second column 320 includes MAC addresses, which references MAC addresses associated with hypervisors identifiers referenced in first column 310. The content of cells in third column 330 includes network switch identifiers, which identify network switches associated with MAC addresses in second column 320. The content of cells in fourth column 340 includes port identifiers, which identify ports on corresponding network switches listed in third column 330. Therefore, hypervisor forward table 300 associates one or more MAC addresses of each hypervisor with a port on a switch. In some computer systems with a hierarchy of network switches, or other network topologies, such as redundant network links, there may be multiple entries for each MAC and each port.

The content of first column 310, second column 320, third column 330 and fourth column 340 indicates that, as shown in FIG. 1, network switch 109 is connected to non-virtual computer 101(A) through Ethernet NIC 102(A) and switch port A. Non-virtual computer 101(B) is connected to switch 109 through Ethernet NIC 102(B) and switch port B.

Hypervisor forward table 300 provides information similar to that of network switch forward table 200, as discussed in reference to FIG. 2. However, these tables differ in how they are populated. The content for network table 200 is retrieved from managed network devices, such as network switch 109. The content for hypervisor forward table 300 is retrieved from a network topology database, such as a topology database 116 as previously discussed in reference to FIG. 1. In a stable networking environment, both tables would typically show the same hypervisor network connectivity. In reference to FIGS. 1 and 2, discrepancies between the two tables indicate a difference between the observed state of hybrid cloud environment 100, as recorded in network switch forward table 200, and the recorded state of hybrid cloud environment 100, as recorded in network topology database 116.

Figure 4:
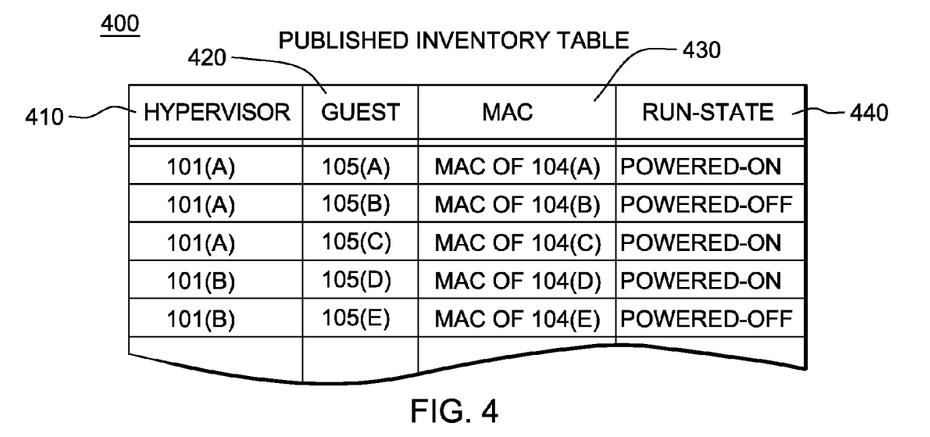
FIG. 4 shows one example of a published inventory table.

FIG. 4 shows one example of a published inventory table. As discussed in reference to FIG. 1, published inventory table 400 is implemented on non-virtual computers 101(A), 101(B) functioning as hypervisors via hosting operating systems 106(A), 106(B).

In one embodiment, published inventory table 400 includes four columns: a first column 410, a second column 420, a third column 430 and a fourth column 440. The content of entries in first column 410 includes hypervisor identifiers, which identify operating hypervisors. The content of cells in second column 420 includes guest operating system identifiers, which identify guest operating systems running on corresponding hypervisors referenced in first column 410. The content of cells in third column 430 includes MAC addresses associated with guest operating systems references in second column 420. The content of cells in fourth column 440 includes a run-state indicator, e.g., a keyword indicating the operating state of guest operating systems referenced in second column 420. In one embodiment, some typical keywords include "powered-on", "powered-off", "suspended" and "crashed". Other keywords may be used as well.

The content of first column 410, second column 420, third column 430 and fourth column 440 indicates that, as shown in FIG. 1, non-virtual computer 101(A) hosts three guest operating systems: 105(A), 105(B) and 105(C). Guest operating systems 105(A) and 105(C) are powered-on and guest operating system 105(B) is powered-off. Non-virtual computer 101(B) hosts two guest operating systems 105(D) and 105(E). Guest operating system 105(D) is powered-on and guest operating system 105(E) is powered-off.

In reference to FIG. 1, some of the contents to be included within published inventory table 400 can be retrieved by communicating with individual non-virtual computers 101(A), 101(B) through management interfaces, such as QEMU 107(A), SNMPD 108(A), QEMU 107(B) and SNMPD 108(B), to obtain data corresponding to their respective table rows. Some hypervisor products, such as VMWARE®, ESX® and KVM®, may provide centralized views over a collection of hypervisors and data for published inventory table 400 can be retrieved by consulting a centralized virtualization controller.

Figure 5:
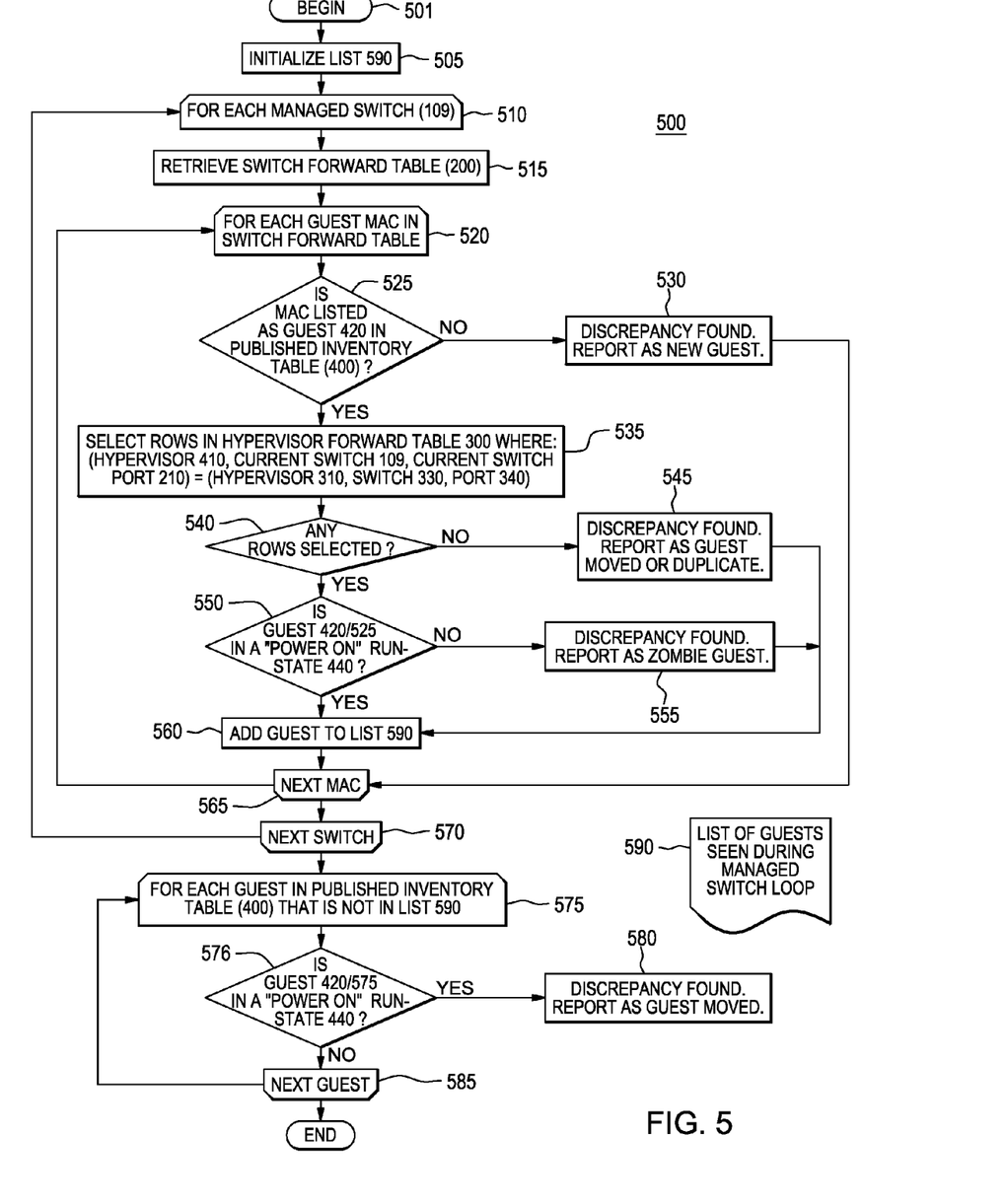
FIG. 5 shows one example of a flowchart depicting a polling network discrepancy detection process.

FIG. 5 symbolically shows a flowchart of one example of a network discrepancy detection process implemented in hybrid cloud environment 100. Generally, in one implementation, in reference to FIGS. 1 to 4, a process 500 generally compares, via periodic or non-periodic polling, the observed state of hybrid cloud environment 100, as disclosed by the contents of a data structure, such as network switch forward table 200, against the recorded state of hybrid cloud environment 100, as disclosed by the contents of a data structure, such as published inventory table 400, and generates a report of any discrepancies found.

Process 500 begins at step 501. Process 500 is performed by auditing engine, such as auditing engine 122. In one implementation, all network traffic is performed using at least one of the TCP/IP and UDP network protocols.

In step 505, a list 590 is initialized. List 590 is a list of guest operating system identifiers as would be seen, in one embodiment, in second column 420 of published inventory table 400. Initially, list 590 is empty.

In step 510, process 500 begins a loop over each managed network switch. In one implementation, the managed network switch is network switch 109.

In step 515, a network switch forward table is retrieved. In one implementation, network switch forward table is network switch over table 200.

In step 520, another, inner, loop is begun. This loop iterates over each entry in the network switch forward table that contains a guest operating system MAC address, such as MAC addresses disclosed in third column 430 of published inventory table 400. As discussed above, in one implementation, network switch forward table 200 can be retrieved by communicating to the managed network switch through a network protocol, such as SNMP. Network switch forward table 200 will typically contain many MAC addresses. This process only concerns itself with the MAC addresses, which are associated with guest operating systems. These MAC addresses can be found by consulting second column 420 of published inventory table 400.

In one implementation, the MAC addresses of guest operating systems are constructed with a known prefix. For example, each MAC address begins with "54:52:00" and is followed by three pairs of random hexadecimal digits. This identification system allows for a rapid identification of guest operating systems MAC addresses disclosed within switch forward table 200. This identification system also allows process 500 to subsequently determine the presence of guest operating systems MAC addresses not disclosed within published inventory table 400. For example, the ESX and KVM hypervisors have a reserved range of MAC addresses to provide to guest operating systems.

In step 525, a check is made to see if a guest operating system MAC address, as disclosed by second column 220 in network switch forward table 200, is listed within column 430 of published inventory table 400. If the MAC address is not found, then execution of process 500 branches to step 530 where a report or a message of a discrepancy is generated. In one implementation, the report or the message could be an e-mail, a message on a paging device, an entry in a database, a message sent to a "message queue" or a message sent over a REST (Representational State Transfer) API. In a preferred embodiment, the reports are messages which are sent to a workflow manager (See for example FIG. 6). This branching typically indicates that a new guest has been powered on and is being hosted by a hypervisor. The report includes an identifier associated with managed network switch, as disclosed in step 510, MAC address, as disclosed in second column 220, and network switch port, as disclosed in first column 210 of network switch forward table 200. Such reports are sent, either individually or collectively, to reaction workflows, such as reaction workflows 740 as described in reference to FIG. 7. Consequently, method proceeds to step 565.

However, if in step 525, guest operating system 420 is found within published inventory table 400 having MAC address 220, then the execution of process 500 continues to step 535.

In 535, at least one row is selected from a hypervisor forward table. Specifically, in one implementation, all rows of hypervisor forward table 300, which correspond to the hypervisor hosting the found guest operating system, the current network switch and the current network switch port, are selected. For example, the current selection is made from hypervisor forward table 300 using the following criteria:
Hypervisor column 410=hypervisor column 310 and
Network switch 610/109=switch column 330 and
Network switch port column 210=network switch port column 340.

In step 540, a check is made to determine if any such rows were found.

In step 545, if no rows were found, a report of a discrepancy is generated. This report is similar to the report generated in step 525. This report indicates that a guest operating system either moved, was cloned, or that two hypervisors are concurrently hosting the same guest operating system. Here, the symptom of network discrepancy is that the network switch has detected network activity of a guest operating system on an unexpected network switch port. Consequently, the process proceeds to step 560.

If any rows were found in the hypervisor forward table by the check performed in step 540, then execution of process 500 continues to step 550. Those familiar with database queries will note that since process 500 does not reference the contents of any rows selected in step 535, alternatively, steps 535 and 540 may be written as existence tests.

In step 550, published inventory table 400 is consulted in order to determine the known run-state 440 of guest operating system 420. If guest operating system disclosed in second column 420 was known to be in state 440 where it should not be communicating (e.g. if it is powered-off) and the network switch is reporting that guest operating system 420 is communicating, then a discrepancy has been detected and process 500 execution branches to step 555, where a report is generated. This report is similar to the report generated in step 525. In one implementation, this type of discrepancy may indicate a hypervisor error where the hypervisor continues to run the guest operating system although the guest operating system is listed as powered off in its inventory table. In one implementation, the discrepancy may be due to a lag between the network switch not expiring the network switch forward table entry, if the guest operating system was recently powered off. Regardless of the branch taken in 550, execution of process 500 continues to step 560.

In step 560, guest operating system 420 is added to list 590.

In step 565, the execution of process 500 iterates to the next guest MAC in the network switch forward table and loops back to step 520. If there are no guest operating systems left in the network switch forward table 200 for network switch 109, then the execution of process 500 continues to step 570.

In step 570, process 500 iterates via the outer loop to step 510 for the next network switch. If there are no further network switches left, then the execution of process 500 continues to step 575.

In step 575, process 500 begins another loop iterating over any guests in the published inventory table 400 that are not disclosed in list 590, which has been populated with the identifiers of guest operating systems 420 who are communicating over the network via network switch 109. Hence, those guest operating systems 420 in the published inventory table 400 not in list 590 are those who are not communicating with the network.

In step 576, a check is made in order to determine if guest operating system 420/575 is in a state where it should be communicating. If guest operating system 420 is in a state such as "powered-on," but was not found to be communicating, step 580 is executed i.e. a discrepancy report is generated. This report is similar to the report generated in step 525. Some network devices, such as printers, will have long periods of inactivity and generate network traffic. However, typically guest operating system, such as guest operating system 420, visiting a cloud maintains a steady flow of network traffic. Accordingly, an absence of network traffic could indicate a problem. In one implementation, this problem is indicative of guest operating system 420 crashing or being frozen and this state (e.g. crash or freeze) may not be known to the hypervisor. In one implementation, the guest operating system 420 could have both been moved to another hypervisor and remain in the original hypervisors inventory table.

In step 580, a discrepancy report is generated. This report is similar to the report generated in step 525. This branching typically indicates that a new guest has been powered on and is being hosted by a hypervisor. In one implementation, the report includes guest identifier 420, and, optionally, other information in published inventory table 400 (hypervisor 410, MAC 430 and run-state 440).

In step 585, process 500 loops back to step 570 in order to determine if there are more guest operating systems which are not communicating. When all the guest operating systems 420 have been exhausted, process 500 ends at step 599.

In one implementation, the selection of guest operating systems 420 performed in step 575 could also include the criteria of step 576 i.e. the condition of step 575 could be incorporated into step 570.

Figure 6:
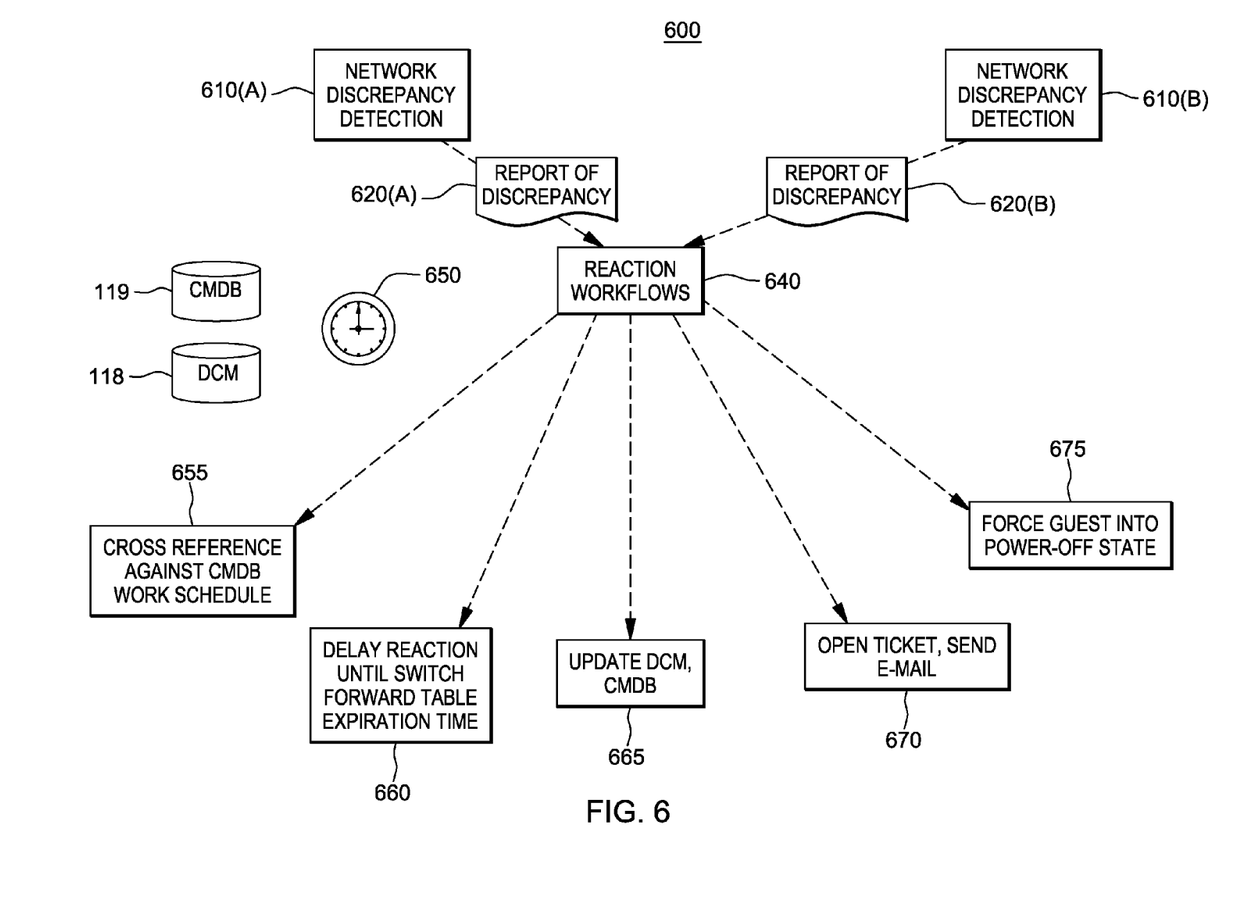
FIG. 6 shows one example of a diagram showing reaction workflows generated upon a detection of a network discrepancy.

FIG. 6 shows one example of a diagram showing reaction workflows generated upon a detection of a network discrepancy. In one embodiment, one or more network discrepancy detection processes 600, shown in the diagram as 610(A) and 610(B), generate respective discrepancy reports 620(A), 620(B) of observed discrepancies between the recorded system state and the observed system state. Discrepancy reports 620(A), 620(B) are sent to a workflow manager 640, which reacts to the reported discrepancies by invoking one or more workflows.

Workflow manager 640 may be a software program or a module or a hardware device capable of reacting to the receipt and interpretation of the discrepancy reports 620(A), 620(B) by invoking one or more workflows. In one embodiment, the invocation may be an automated process performed by a workflow engine or through an e-mail system. The workflow engine or the email system can be configured to launch scripts upon receipt of e-mail from certain addresses or with certain subject lines. Workflow manager 640 may execute at least one of the following workflows.

Workflow 655 cross references the network discrepancy against work scheduled to be performed within the CMDB 119. Discrepancies could be a normal artifact of work performed during, for example, a scheduled outage.

Workflow 660 delays or ignores reaction for a period of time. In one embodiment, as described in FIG. 5 in reference to step 555, first zombie guest operating system discrepancy might be discarded because network switch forward table 200 entries may not be up-to-date. However, generation of subsequent zombie guest operating system reports could cause some action to be taken.

Workflow 665 updates DCM 118 and CMDB 119 databases with new information gained from discrepancy reports 620(A), 620(B).

Workflow 670 opens an "incident" ticket to a ticketing system and/or sends an email to a system operator notifying the operator of the observed network discrepancy.

Workflow 675 forces the guest operating system into a powered off state. In one embodiment, this may occur when there appears to be a duplication of guest operating systems running in the system.

Figure 7:
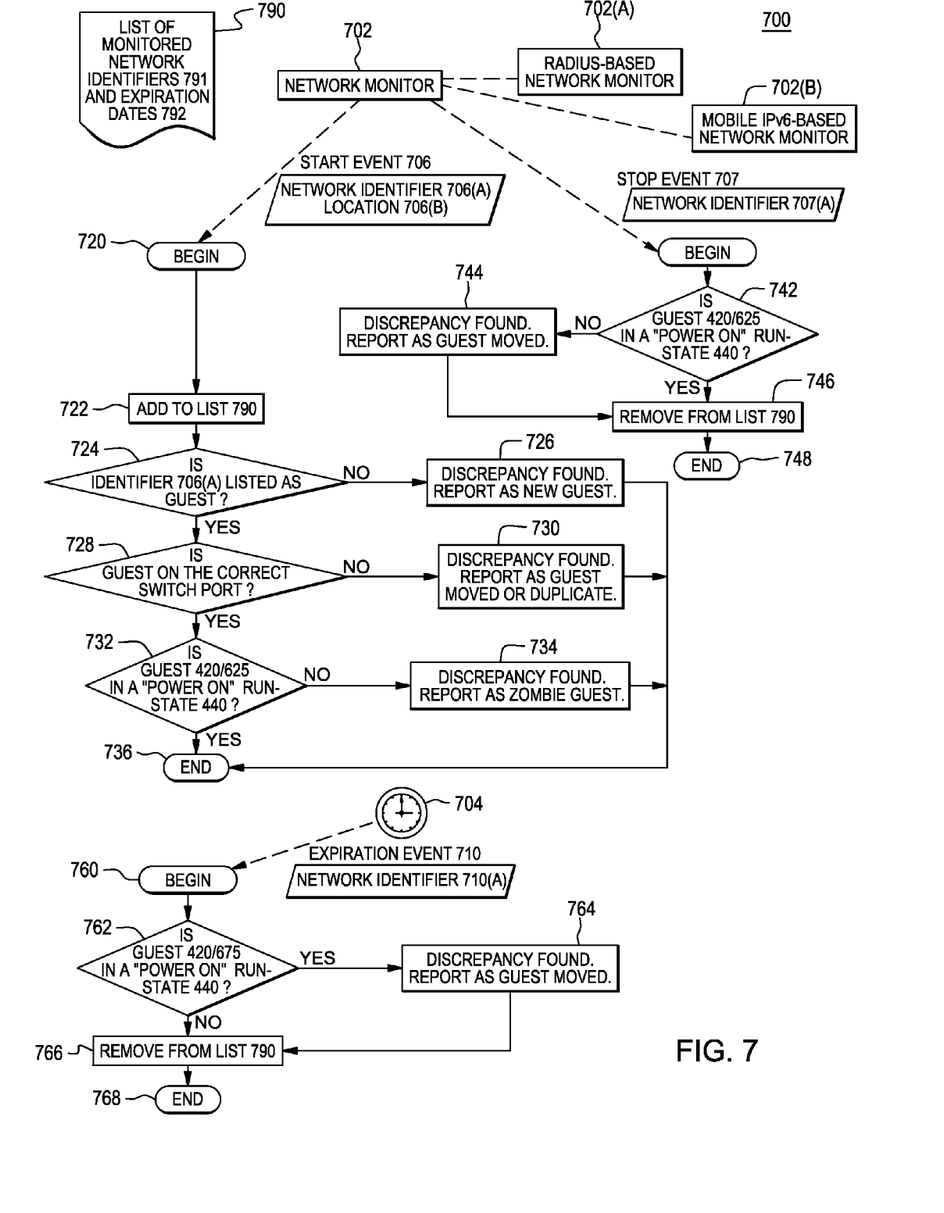
FIG. 7 shows one example of a flowchart of an event-based network discrepancy detection process.

FIG. 7 shows one example of a flowchart of an event-based network discrepancy detection process. Generally, the flowchart of FIG. 7 is similar to the flowchart of FIG. 5 except that the flowchart of FIG. 7 is interrupt/event driven instead of a polling workflow. In one implementation, a "Network monitor" watches the network for Ethernet port connections (in the case of RADIUS and the 802.1x protocol), or for mobile IPv6 negotiations (when a company is expands their network into a cloud system, or contracts and reduces their cloud presence). In one implementation, the network monitor gives off "start" and "stop" event signals when a guest starts communicating over the network or ends its communications. In one implementation, each event has a specific sub-workflow to follow. In one implementation, a timer is used so that guest operating systems can expire due to inactivity. In one implementation, mobile IPv4 protocol is used. In one implementation, a mobile IPv4 and/or IPv6 backward/downward compatible network protocol is used.

Mobile IP is an Internet Engineering Task Force (IETF) standard communications protocol that is designed to allow mobile device users to move from one network to another while maintaining a permanent IP address. Mobile IPv4 is described in IETF RFC 3344 (Obsoleting both RFC 3220 and RFC 2002), and updates are added in IETF RFC 4721. Mobile IPv6 is described in IETF RFC 3775. RFCs 3344, 3220, 2002, 4721 and 3775 are all incorporated by reference as if fully set forth herein.

FIG. 7 shows a flowchart of a process 700 for an event-based handling of a start event 706, a stop event 707 and an expiration event 710. A network monitor process 702 is capable of generating a start event 706 and a stop event 707.

The start event 706 contains a network identifier 706(A) and a location 706(B). Stop event 707 contains a network identifier 707(A) and expiration event 710 also contains a network identifier 710(A).

In one implementation, a network monitor process 702(A) listens for accounting events from RADIUS server 117 (see FIG. 1). RADIUS server 117 receives access to accounting messages from network devices, such as managed network switch 109 during the 802.1x network handshaking protocol when a non-virtual or virtual NICs 102(A), 104(A) connect or disconnect to a network switch port, such as network switch port 109(A) of a network switch 109 (see FIG. 1).

A RADIUS Accounting Request packet includes an Acct-Status-Type attribute with the value "start" is sent by network switch 109 to the RADIUS server 117 to signal the start of the NIC's network access. The "start" records typically include both the MAC address of the NIC and the identifier of the network switch port, such as 109(A). A RADIUS Accounting Request packet containing an Acct-Status-Type attribute with the value "stop" is sent to the RADIUS server when the NIC disconnects from the managed switch. Consequently, the "start" record would be the start event 706 and the "stop" record would be the stop event 707. In one implementation, network identifiers 706(A), 707(A) are MAC addresses and location 706(B) is a switch and port identifier.

In one implementation, a network monitor process 702(B) is a process which listens to network traffic through a mirrored port, such as 109(D) of a network switch 109, or otherwise sniffs the traffic on the network. Specifically, network monitor process 702(B) listens for IPv6 packets which contain a "Binding Update" Mobile IPv6 Destination option.

In implementing, Mobile IPv6, computers are enabled to move throughout a data center or other interconnected network while retaining network connectivity and established network communication sessions. A Home Agent (HA) coordinates communication between the mobile node (MN) and correspondent nodes (CN). Each time the mobile node moves, it obtains a local network address, called a care-of address, and this address is made known to the HA through, in part, the Mobile IPv6 Destination options. When a correspondent node wishes to communicate to the mobile node, it acquires the care-of address through, in part, Mobile IPv6 Destination options. Mobile IPv6 and its Destination options are well known in the art. See, for example, http://www.slideshare.net/guestbeb9a5/introduction-to-mobile-ipv6 for more description of the Mobile IPv6 and its Destination options.

Accordingly, by listening to network traffic, network monitor process 702(B) may determine if a guest virtual computer, such as guest 105(A), is operating as a home agent, a correspondent node, and/or a mobile node. Start events 706 and stop events 707 are generated when the Mobile IPv6 Destination options indicate that a node has become a mobile node, ceased being a mobile node, or that it has changed its care-of address. In one implementation, network identifiers 706(A), 707(A) are IPv6 addresses. Location 706(B) is the subnet of the mobile node's care-of address.

Process 700 maintains a list 790 of network identifiers 791 and expiration dates 792. Network identifiers 791 are MAC addresses where the network monitor process 702 is RADIUS server-based 702(A). The network identifiers 791 are IPv6 addresses in the case of network monitor process 702 is Mobile IPv6 traffic-based 702(B).

In one implementation, the execution of the event-based process 700 begins at step 720 upon receipt of a start event 706. Each start event 706 contains a network identifier and this network identifier is added to list 790. Expiration date 792 for the new list entry is set to a time value in the future. In one implementation, expiration date 792 is the current time plus a fixed number of seconds. If list 790 already contains an entry with the same network identifier, that entry is removed from list 790.

Process 700 then determines if a guest operating system is associated with network identifier 706(A). Where network identifier 706(A) is a MAC address, this determination is done by examining published inventory table 400 (see FIG. 4). Where network identifier 706(A) is an IPv6 address, the determination is done by examining one or more of CMDB 119, DCM 118 and topology 116 databases (see FIG. 1). If identifier 706(A) is not associated with a known guest operating system, a discrepancy report 726 is generated (similar to step 530 of process 500 in FIG. 5). Consequently, the execution of process 700 then ends at step 736.

In step 728, if a guest operating system is found, then a test is performed to determine if the guest operating system is operating from the proper location. Where location 706(B) is a switch and port identifier, topology database 116 is consulted to determine if the switch and port values match what is contained in topology database 116. Where location 706(B) is a subnet, CMDB 119 and/or DCM 118 are consulted to determine if the subnet value matches what is contained in the database(s). If the test fails to match, a discrepancy report 730 is generated (similar to step 545 of process 500 in FIG. 5). Consequently, the execution of process 700 then ends at step 736.

In step 732, if the guest is determined to be at the proper location, then a test is performed (similar to step 550 of process 500 in FIG. 5) in order to determine if the guest is known to be in a powered-on state. Where 706(A) is an IPv6 address, the known state may be determined by examination of the CMDB 119 and/or DCM 118 databases. If CMDB 119 and/or DCM 118 databases do not include such state information, then the performance of this step is omitted and the test is considered to have passed.

If the test in step 732 failed, a discrepancy report 734 is generated (similar to step 555 of process 500 in FIG. 5). Consequently, the execution of process 700 then ends at step 736.

In one implementation, the execution of the event-based process 700 begins 740 upon receipt of a stop event 707.

In step 742, a test, as described in reference to step 732, is performed in order to determine if a guest associated with network identifier 707(A) is known to be in a powered-on state. If the test of step 742 fails, then a discrepancy report 744 is generated (similar to step 580 of process 500 in FIG. 5). Regardless of the result of the test, the execution of process 700 continues with step 746 when the entry, if present, of list 790 that contains network identifier 707(A) is deleted. The execution of process 700 then ends at step 748.

An expiration event 710 is generated when expiration date 792 of an entry in list 790 has already expired. Expiration event 710 includes network identifier 710(A) field which is equal to network identifier 791 of the expired list entry.

In one implementation, the execution of the event-based process 700 begins at step 760 upon receipt of expiration event 710. As in steps 732 and 742, a test 762 is performed to determine if a guest associated with network identifier 710(A) is known to be in a powered-on state. If the test of step 762 is passed, then a discrepancy report 764 is generated (similar to step 580 of process 500 in FIG. 5). Regardless of the result of the test, the execution of process 700 continues with the performance of step 766 when the entry, if present, of list 790 that includes the network identifier 710(A) is deleted. The execution of process 700 then ends at step 768.

While the foregoing is directed to embodiments of the presently disclosed technology, other and further embodiments of the disclosed technology may be devised without departing from the basic scope thereof, and the scope thereof is determined by the claims that follow.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident, software, micro-code, etc.) or an embodiment combining software and hardware aspects that may all generally be referred to herein as a "circuit," "module" or "system."

Furthermore, aspects of the present disclosure may take the foam of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language, such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of disclosed herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 1 to 7 illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the embodiments of the present disclosure have been described in detail, it should be understood that various changes and substitutions can be made therein without departing from spirit and scope of the disclosure as defined by the appended claims. Variations described for the present disclosure can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present disclosure.

Reference in the specification to "one embodiment" or to "an embodiment" means that a particular feature, structure, or characteristic described in connection with the embodiments is included in at least one embodiment. The appearances of the phrase "one embodiment" in various places in the specification are not necessarily all referring to the same embodiment.

The invention claimed is:

1. A computer-implemented method for detecting and reacting to a network discrepancy within a data center network environment, the method comprising:

observing a state of the data center network environment from content obtained through a communication with a network switch according to a network communication protocol, said observed state of the data center network environment determined using polling;

recording a state of the data center network environment as determined from data content within one or more of: a hypervisor forward table and a published inventory table;

monitoring network traffic between a first computer configured as a first hypervisor inter-networked within the data center network environment and hosting one or more guest operating systems, and a second computer inter-networked within the data center network environment, the first computer or the second computer is connected via a non-virtual network interface card (NIC) connection to a first network port on the network switch connected to a network router, the first hypervisor having a virtual NIC for connecting a guest operating system to the non-virtual NIC, all NICs having a unique MAC address, the second computer being configured as a second hypervisor, wherein the network switch is connected to a first server and a second server via a respective second network switch port and a third network switch port, the first server comprising a configuration management database (CMDB) and a topology database, the second server comprising a guest placement engine, a network discovery engine and an auditing engine;

detecting, via said monitoring, a presence of a predetermined condition representing a presence of the network discrepancy in the data center network environment between a recorded state of the data center network environment and an observed state of the data center network environment, rectifying, upon the detection of the presence of the predetermined condition, an effect associated with the presence of the predetermined condition in the data center network environment, the rectifying including: invoking, via a workflow manager, at least one of the following workflows: cross-referencing the network discrepancy against work scheduled to be performed within the CMDB, delaying or ignoring reaction for a period of time, updating the CMDB with new information gained from a reporting step, notifying a data center operator of the network discrepancy and forcing the guest operating system into a powered-off state; and said polling including determining whether a MAC address associated with a guest operating system and disclosed via obtained data content is matched with the MAC address associated with the guest operating system via data content disclosed in the hypervisor forward table, the polling step including an inquiry as to a power-on state of the guest operating system; placing, if matched, MAC address into a list of guest operating systems; and matching, if unmatched, the guest operating system as disclosed by data content of the published inventory table to the unmatched guest operating system not disclosed in the list of guest operating systems.

2. The method as recited in claim 1, wherein the monitoring and the rectifying steps are performed by different entities, each entity is a computer program or a human user.

3. The method as recited in claim 1, wherein the first server further includes a RADIUS server.

4. The method as recited in claim 1, wherein the determining of said observed state further implements an event-based technique performed by a network monitor process, the network process monitor being at least one of the following: a RADIUS-based network monitor process monitoring the data center network environment for Ethernet port connections and Mobile IP-based network monitor process monitoring the data center network environment for Mobile IP negotiations; and the network monitor process configured to generate at least one of the following events: a start event and a stop event.

5. The method as recited in claim 4, further comprising: providing a list of network identifiers corresponding to configured hypervisor network elements, wherein the event-based technique further comprises at least one of the following: determining a guest status of the guest operating system via monitoring the monitored network identifiers, determining connectivity information associated with the guest operating system, determining a powered-on status of the guest operating system.

6. The method as recited in claim 5, wherein the list of monitored network identifiers includes an expiration date, an expiration event is generated when an expiration date of an entry in the list of monitored network identifiers is expired.

7. A computer system for detecting and reacting to a network discrepancy within a data center network environment, the system comprising:

a memory;

a processor in communications with the computer memory, wherein the computer system performs a method to:

monitor network traffic between a first computer configured as a first hypervisor inter-networked within the data center network environment and hosting one or more guest operating systems, and a second computer inter-networked within the data center network environment, the first computer or the second computer is connected via a non-virtual network interface card (NIC) connection to a first network port on a network switch connected to a network router, the first hypervisor having a virtual NIC for connecting a guest operating system to the non-virtual NIC, all NICs having a unique MAC address, the second computer being configured as a second hypervisor, wherein the network switch is connected to a first server and a second server via a respective second network switch port and a third network switch port, the first server comprising a configuration management database (CMDB) and a topology database, the second server comprising a guest placement engine, a network discovery engine and an auditing engine;

observe a state of the data center network environment from content obtained through a communication with a network switch according to a network communication protocol, said observed state of the data center network environment determined using polling;

record a state of the data center network environment as determined from data content within one or more of: a hypervisor forward table and a published inventory table;

detect, via said monitoring, a presence of a predetermined condition representing a presence of the network discrepancy in the data center network environment between a recorded state of the data center network environment and an observed state of the data center network environment, rectify, upon the detection of the presence of the predetermined condition, an effect associated with the presence of the predetermined condition in the data center network environment, the rectifying including: invoking, via a workflow manager, at least one of the following workflows: cross-referencing the network discrepancy against work scheduled to be performed within the CMDB, delaying or ignoring reaction for a period of time, updating the CMDB with new information gained from a reporting step, notifying a data center operator of the network discrepancy and forcing the guest operating system into a powered-off state; and said polling including determining whether a MAC address associated with a guest operating system and disclosed via obtained data content is matched with the MAC address associated with the guest operating system via data content disclosed in the hypervisor forward table, the polling step including an inquiry as to a power-on state of the guest operating system; placing, if matched, MAC address into a list of guest operating systems; and matching, if unmatched, the guest operating system as disclosed by data content of the published inventory table to the unmatched guest operating system not disclosed in the list of guest operating systems.

8. The system of claim 7, wherein the monitoring and the rectifying steps are performed by different entities, each entity is a computer program or a human user.

9. The system of claim 8, wherein the first server further includes a RADIUS server.

10. The system of claim 9, wherein the determining of said observed state further implements an event-based technique performed by a network monitor process, the network process monitor being at least one of the following: a RADIUS-based network monitor process monitoring the data center network environment for Ethernet port connections and Mobile IP based network monitor process monitoring the data center network environment for Mobile IP negotiations; and the network monitor process configured to generate at least one of the following events: a start event and a stop event.

11. The system of claim 10, further comprising: providing a list of network identifiers corresponding to configured hypervisor network elements, wherein the event-based technique further comprises at least one of the following: determining a guest status of the guest operating system via monitoring the monitored network identifiers, determining connectivity information associated with the guest operating system, determining a powered-on status of the guest operating system, and the list of monitored network identifiers includes an expiration date, an expiration event is generated when an expiration date of an entry in the list of monitored network identifiers is expired.

12. A computer program product for detecting and reacting to a network discrepancy within a data center network environment, the computer program product comprising:

a storage medium, said medium not a propagating signal, said storage medium readable by a processing circuit and storing instructions for execution by the processing circuit for performing a method comprising:

monitoring network traffic between a first computer configured as a first hypervisor inter-networked within the data center network environment and hosting one or more guest operating systems, and a second computer inter-networked within the data center network environment, the first computer or the second computer is connected via a non-virtual network interface card (NIC) connection to a first network port on a network switch connected to a network router, the first hypervisor having a virtual NIC for connecting a guest operating system to the non-virtual NIC, all NICs having a unique MAC address, the second computer being configured as a second hypervisor, wherein the network switch is connected to a first server and a second server via a respective second network switch port and a third network switch port, the first server comprising a configuration management database (CMDB) and a topology database, the second server comprising a guest placement engine, a network discovery engine and an auditing engine;

observing a state of the data center network environment from content obtained through a communication with a network switch according to a network communication protocol, said observed state of the data center network environment determined using polling;

recording a state of the data center network environment as determined from data content within one or more of: a hypervisor forward table and a published inventory table;

detecting, via said monitoring, a presence of a predetermined condition representing a presence of the network discrepancy in the data center network environment between a recorded state of the data center network environment and an observed state of the data center network environment, rectifying, upon the detection of the presence of the predetermined condition, an effect associated with the presence of the predetermined condition in the data center network environment, the rectifying including: invoking, via a workflow manager, at least one of the following workflows: cross-referencing the network discrepancy against work scheduled to be performed within the CMDB, delaying or ignoring reaction for a period of time, updating the CMDB with new information gained from a reporting step, notifying a data center operator of the network discrepancy and forcing the guest operating system into a powered-off state; and said polling including determining whether a MAC address associated with a guest operating system and disclosed via obtained data content is matched with the MAC address associated with the guest operating system via data content disclosed in the hypervisor forward table, the polling step including an inquiry as to a power-on state of the guest operating system; placing, if matched, MAC address into a list of guest operating systems; and matching, if unmatched, the guest operating system as disclosed by data content of the published inventory table to the unmatched guest operating system not disclosed in the list of guest operating systems.

13. The computer program product as recited in claim 12, wherein the monitoring and the rectifying steps are performed by different entities, each entity is a computer program or a human user.

14. The computer program product as recited in claim 13, wherein the first server further includes a RADIUS server.

15. The computer program product as recited in claim 14, wherein the determining of said observed state further implements an event-based technique performed by a network monitor process, the network process monitor being at least one of the following: a RADIUS-based network monitor process monitoring the data center network environment for Ethernet port connections and Mobile IP based network monitor process monitoring the data center network environment for Mobile IP negotiations; and the network monitor process configured to generate at least one of the following events: a start event and a stop event.

16. The computer program product as recited in claim 15, further comprising: providing a list of network identifiers corresponding to configured hypervisor network elements, wherein the event-based technique further comprises at least one of the following: determining a guest status of the guest operating system via monitoring the monitored network identifiers, determining connectivity information associated with the guest operating system, determining a powered-on status of the guest operating system, and the list of monitored network identifiers includes an expiration date, an expiration event is generated when an expiration date of an entry in the list of monitored network identifiers is expired.

* * * * *